US006241996B1

(12) United States Patent
Hahn

(10) Patent No.: US 6,241,996 B1
(45) Date of Patent: Jun. 5, 2001

(54) LIQUID SOY NUTRITIONAL PRODUCTS

(75) Inventor: Douglas Earl Hahn, Plymouth, MN (US)

(73) Assignee: Novartis Nutrition AG, Berne (CH)

( * ) Notice: Subject to any disclaimer, the term of this patent is extended or adjusted under 35 U.S.C. 154(b) by 0 days.

(21) Appl. No.: 09/289,497

(22) Filed: Apr. 9, 1999

(51) Int. Cl.[7] ............................. A61K 47/00; A23L 2/00; A23L 1/223; A23L 1/30; A23L 1/05; A23G 3/00
(52) U.S. Cl. .................. 424/439; 426/590; 426/639; 426/648; 426/658; 426/661
(58) Field of Search ................ 424/439; 426/590, 426/639, 658, 661, 648

(56) References Cited

U.S. PATENT DOCUMENTS

H1620 * 12/1996 Dolan et al. ...................... 424/439
4,834,990 * 5/1989 Amer .................................. 426/74
5,997,915 * 12/1999 Bailey et al. ........................ 426/72

FOREIGN PATENT DOCUMENTS 296 11 147 U * 11/1996 (DE) .
0 425 423 B1    4/1995 (EP) ................. A23L/1/305
97/31546        9/1997 (WO) ................. A23L/1/305

OTHER PUBLICATIONS

Potter, SM, et al. "Depression of plasma cholesterol in men by consumption of baked products containg soy protein[1-3]" Am J Clin Nutrition, vol. 58, pp. 501–506 (1993).

* cited by examiner

Primary Examiner—Jose' G. Dees
Assistant Examiner—Alton Pryor
(74) Attorney, Agent, or Firm—Michael P. Morris

(57) ABSTRACT

The present invention comprises a novel nutritional dietary composition that can be formulated for oral and enteral administration. The formulation derives substantially all of its protein from soy protein isolate or, in a second embodiment, from soy protein isolate and soy protein concentrate. If desirable, up to 10.0 wt. % of the soy protein component can be replaced with caseinates, free amino acids and mixtures thereof. A carbohydrate such as corn syrup, a gum such as carrageenan gum, a non-reactive magnesium source and optionally, dietary soy protein concentrate as well as various vitamins and other excipients may also make-up the rest of the formulation. The high soy composition provides an inexpensive and high nutritional quality source of protein.

27 Claims, No Drawings

LIQUID SOY NUTRITIONAL PRODUCTS

FIELD OF THE INVENTION

The present invention relates generally to liquid nutritional dietary compositions and their use as dietary supplements or in enteral feeding formulations. More specifically, the present invention relates to nutritional dietary formulations in which substantially all of the available protein is derived from soy.

BACKGROUND OF THE INVENTION

There are many nutritional dietary supplements known in the art that are commercially available. Most consist of a protein component, a carbohydrate component, a lipid fraction and any number of other components such as vitamins, stabilizers, emulsifiers, flavor agents and the like. These are particularly of value in the treatment of patients who are too old, sick or disabled to bite, chew and swallow their food. The liquid nutritional formulations can be administered to the patient by using a gastrostomy or enteral feeding tube. Gastrostomy tubes enter the stomach directly through an incision in the stomach known as an ostomy or down the through the mouth and throat.

The use of enteral feeding tubes which supply nutritional requirements of a patient directly to the stomach or other location in the digestive tract is often required when the patient for one reason or another cannot swallow, is unable to chew his or her food, or is unable to ingest enough food to meet the body's caloric requirements. Burn victims, the chronically ill, those afflicted with Alzheimer's disease and cancer patients are prime examples of these types of individuals. Enteral feeding usually employs a nasogastric tube to transport the liquid nutritional products through the nasal cavity and pharayrx and into the stomach.

U.S. Pat. No. 5,576,287 to Zalaga et al. refers to a nutritional composition allegedly useful in the treatment of renal failure comprising a liquid formulation consisting of meat proteins or meat and vegetable proteins with a mixture of amino acids, peptides and polypeptides. Soy protein is not specifically taught and none of the meat or vegetable proteins are specifically disclosed. At least 15% of the formulation is protein.

U.S. Pat. No. 5,821,217 to Forse et al. refers to an enteral nutritional formulation consisting of a fat component (2.0–4.0 gm/l), a protein hydrosylate component (50–100 gm/l), a carbohydrate component (160–250 gm/l) and water. Soy protein hydrosylate is one of a number of possible protein components such as casein, whey, lactalbumin and the like. Safflower oil and sunflower oil comprise the preferred fats, and corn starch is the preferred carbohydrate. The formulations are disclosed as being particularly useful in the treatment of critically ill patients while minimizing the risk of pulmonary aspiration and/or gastrointestinal dysfunction.

U.S. Pat. No. 5,308,832 to Garleb et al. refers to a low carbohydrate, high fat nutritional formula useful in treating patients with neurological injury and/or disorders. The composition consists of a lipid blend of fatty acids (70%–80% of the total caloric content) a protein component (15%–30% total caloric intake) and a carbohydrate fraction ($\leq 5.0\%$ caloric content). The formulation may further comprise dietary fiber and/or an antioxidant (e.g., vitamins).

U.S. Pat. No. 5,229,136 to Mark et al. refers to a low caloric density enteral feeding composition comprising a protein component (which provides 18–25% of the total caloric content of the composition), a fat component (35%–50% of the total caloric content of the composition), a fiber component ($\leq 14$ grams/liter) and a carbohydrate component (35%–40% caloric content). Protein sources may include casein, hydrolyzed whey protein and hydrolyzed soy protein. Suitable lipids include medium chain triglycerides blended with soy oil and maltodextrin may be used as the carbohydrate. The formulation is disclosed as being particularly useful in the treatment and prevention of diarrhea.

U.S. Pat. No. 4,670,268 to Mahmond discloses and claims an enteral nutritional hypoallergenic formula consisting of a carbohydrate component (8.0%–20% caloric content) and an emulsifier consisting of dextrinized starch modified by octeryl succinic acid anhydride which causes the formulation to form a stable, non-browing emulsion. The composition may also further comprise free amino acids and carrageenan or xanthan gum as additional stabilizers. Soy bean, whey or casein hydrosylates may comprise the protein fraction while sucrose, maltodextrin, hydrolyzed starch and a laundry list of other starches and sugars may comprise the carbohydrate fraction. Safflower oil, soy oil and medium chain triglycerides serve as the lipid component. Whereas the formulation per se is admittedly not highly novel, the use of the emulsifier as the stabilizing component is the heart of the invention.

A number of other United States patents disclose methods and processes for preparing defatted soy, stabilized soy protein base and phosphorylated soy protein for use in food and beverage applications. See e.g., U.S. Pat. No. 4,322,344 to Chen et al; U.S. Pat. No. 3,846,560 to Hempenis et al; U.S. Pat. No. 3,713,843 to Pam-el et al. and U.S. Pat. No. 3,645,745 to Magnino et al.

European Patent Application No. EP 0 626 175 A2 to Dewille et al. discloses a liquid enteral nutritional product consisting of soy protein hydrosylate fraction (50–90 wt %), an intact protein fraction (10 wt %–30 wt %) consisting of sodium caseinate, pea or whey protein, and carrageenan.

European Patent Application EP 0 626,176 A2 to Cope et al. discloses and claims a nutritional formulation for patients undergoing chemotherapy consisting of a soy protein hydrosylate component (up to 90 wt %), intact protein (10 wt %) such as pea and whey protein and fat. The composition may further comprise dietary fiber and β-carotene.

European Patent Application EP 0 603,726 A2 to Dube et al. discloses nutritional compositions for enteral feeding containing a vitamin D ester, an amino acid source, a carbohydrate component and a lipid component. The compositions are asserted to have improved vitamin D storage stability. Soy protein is one of a number of enumerated amino acid sources that also include casein, whey protein and protein hydrolysate. Corn syrup is also one of many enumerated carbohydrates useful in the preparation of the composition.

European Patent Application No. EP 0 564,804 A1 to Trimbo et al. discloses an improved high protein liquid nutrition formula particularly useful in the treatment of patients with elevated wound healing requirements. The composition consists of a protein component, a fat source, a carbohydrate component, a source of zinc, vitamin A, β-carotene and a source of thiamine. Dietary fiber may also optionally be added in the form of soy polysaccharide. Soy protein is again listed as a possible protein component and preferably comprises at least 18% of the total composition.

International Application No. PCT/US96/19665 to Antinone et al. discloses a method for the preparation of a stable liquid nutritional composition consisting of a protein source, carbohydrates, oils and soy polysaccharide as a source of dietary fiber. Soy protein is listed as one of a number of possible protein sources.

European Patent Application Nos. EP 0 666,034 A1 and EP 0 752,212 A2 both to Samoto et al. disclose a process for the preparation of fractionated soy bean proteins and nutritional compositions comprising them. The defatted fractional protein compositions are associated with soybean.

It is an object of the present invention to prepare a stable, highly nutritional liquid formulation in which substantially all of the protein incorporated therein comes from soy. It is a further object of the present invention to prepare a highly nutritional liquid composition wherein the protein source is comprised of soy protein isolate or a combination of soy protein isolate and soy protein concentrate. A unique combination of the soy together with a number of other components allows for the preparation of a highly nutritional shelf stable soy protein formulation that is both temperature and shelf stable with none of drawbacks or limitations often associated with soy-based products.

SUMMARY OF THE INVENTION

The present invention comprises a stabilized, highly nutritional feeding composition in which substantially all of the protein component (90–100 wt %) is derived from soy and is incorporated in said composition at high levels. Such nutritional dietary formulations may comprise a protein component that consists of soy protein isolate, optionally in combination with soy protein concentrate. The formulation also comprises a carbohydrate component and a stabilizer comprised of a dispersible non-reactive source of magnesium and, optionally, a gum component, so as to produce a product that is thermally stable and resistant to protein denaturation, has excellent emulsion stability and no mineral sediment. The formulation may also optionally comprise soy protein concentrate which contributes both soy protein and soy fiber to the formulation. Also, if desired, up to about 10 wt % of the total protein available can consist of caseinates and/or free amino acids.

DETAILED DESCRIPTION OF THE INVENTION

The nutritional soy protein formulations of the present invention are particularly useful in enteric feeding applications wherein sickly or ill patients require a highly nutritional source of protein, carbohydrates, fat and vitamins and minerals. There is presently no commercially available enteral feeding formulation in which soy is the major source of protein. The highest estimated soy protein in a current commercial product is about 35%. Although some publications refer to higher concentrations of soy protein, food scientists have discovered that compositions containing higher amounts of soy protein are difficult to formulate into shelf stable products as discussed below.

Soy flour is the most basic soy-protein product produced from soybean flakes. Soy flour is ground from high-quality, clean, de-hulled soybeans after most of the oil has been removed. it contains typically not less than 50% protein on a moisture-free basis. Soy protein concentrate is a further refined product prepared from high-quality, clean, dehulled soybeans by removing most nonprotein components. It contains typically not less than 65% protein on a moisture-free basis.

Whereas whole soybeans contain only 40% protein, soy flour, soy protein concentrate, and isolated soy protein (soy protein isolate) are typically 50%, 65% and 90% protein, respectively. The fat content of these soy-protein products is low. The carbohydrate contents of soy flour and soy-protein concentrate are 33.9% and 25.4%, respectively, whereas isolated soy protein is virtually free of carbohydrate.

Another advantage to a high soy protein-containing formulation is that these proteins are naturally high in isoflavones, phytosterols and saponins which have been associated with positive nutritional effects such as the reduction of blood serum cholesterol levels. The use of soy proteins offer a number of economic and cost-saving efficiencies as well.

The use of soy protein as the sole source of protein has its own drawbacks and problems from a processing and consumption standpoint however. Soy as a protein is readily denatured by high temperature, acids and exposure to divalent cations. It is often difficult to formulate soy proteins because when soy proteins are combined with traditional components used to create milk protein-based formulas, the resulting product can be thick and curdled, making it impossible to deliver the formula by a feeding tube or difficult to swallow if administered orally through the mouth.

According to this invention, the soy protein isolate is incorporated in the nutritional formulations in an amount of up to about 20.0 wt % based on the total weight of the formulation. Preferably, this is incorporated in an amount of from about 2.0 wt % to about 10.0 wt % and most preferably in an amount of from about 4.0 wt % to 6.0 wt %.

Whereas the soy protein isolate typically comprises 100% of the source of protein in the non-fiber formulation of this invention, in those formulations where it is desirable from a nutritional standpoint to include soy fiber, soy protein concentrate may replace up to 50 wt. % of the soy protein isolate.

The nutritional soy protein supplements may be fashioned in several similar but different formulations. In one embodiment, soy protein isolate comprises essentially 100% of the protein that is available to the patient or consumer. In another embodiment, soy protein (isolate and/or concentrate) comprises at least 90%, and preferably more than 90% of the available protein. In such cases casein and/or free amino acids contribute the remaining amount up to about 10%. In these instances, carbohydrate, stabilizer, and optionally, the gum component and vitamins and minerals comprise the only ingredients.

The importance of fiber in the daily diet has been emphasized over the last several years through the recognition of its effects in preventing heart disease, lowering cholesterol, controlling diabetes and even in fighting cancer. Accordingly, it may be nutritionally beneficial to add a source of fiber to the nutritional products of the invention. For example, a soluble fiber, such as hydrolyzed guar gum and hydrolyzed pectin (Benefiber ; U.S. Pat. No. B1 5,260, 279) does not adversely effect viscosity, but does provide gastrointestinal health benefits. When present, the soluble fiber may be added, alone or together with other less soluble fibers, such as cellulose or saccharides, in an amount of up to 120 g/day.

Soy fiber is, for the most part, insoluble mixture of cellulosic and non-cellulosic structural components of the internal cell wall. Its major fractions are non-cellulosic and consist of acidic polysacchardies, arabino-galactan and arabinan chains. Ten percent are cellulosic components. Acidic polysaccharides are highly branched polymers made of a backbone of D-galacturonic acid and D-galactose interspersed with L-rhaminose.

To this end, a nutritional formulation may incorporate soy fiber or a soluble fiber, or both, as a dietary fiber component together with, for example, the carbohydrate (corn syrup), trimagnesium phosphate and optionally, carrageenan gum portions of the formulation. In this instance, soy protein concentrate, containing the soy fiber, is used as a partial replacement for the soy protein isolate and comprises from about 35.0 wt. % to 40.0 wt. % of the total protein amount. Preferably, the soy protein concentrate comprises about 35 wt % of the total protein amount. The soy protein concentrate is added in amounts of from 1.0 wt. % to 5.0 wt. % of the total weight formulation and preferably in an amount of 2.5 wt % to 3.0 wt %.

In yet another embodiment, up to 10 wt. % of the total soy protein content may be replaced with protein caseinates, free amino acids and mixtures. Suitable caseinates include, for example, sodium caseinate, calcium caseinate and mixtures thereof. Suitable free amino acids include 1-histidine, 1-isoleucine, 1-leucine, 1-lysine, 1-methionine, 1-phenylalanine, 1-tlireonine, 1-tryptophan, 1-valine, 1-alanine, 1-arginine, 1-aspartic acid, 1-cystine, 1-glutamic acid, glycine, 1-proline, 1-serine and 1-tyrosine. Preferably, however, substantially all of the protein (up to 100%) is derived from soy.

In order to overcome thermal and mineral related denaturation and thickening problems associated with soy based compositions, the present invention includes a carbohydrate component, a dispersible, non-reactive source of magnesium and a gum component. The carbohydrate component can be derived from starch hydrolysates such as corn syrup and corn syrup solids, and disaccharides such as sucrose or monosaccharides. The starch-based polysaccharide must be sufficiently hydrolyzed to avoid increasing solution viscosity and to avoid thickening of the nutritional product. Preferably, corn syrup having a dextrose equivalent (DE) from about 20 to about 30, and most preferably a DE of 25 is used since it allows for lower osmolality than syrups that have been more extensively hydrolyzed or those comprised of mono- and disaccharides. The DE of the carbohydrate that is selected may, however, fall outside the preferred DE range of 20–30 depending upon the concentration and osmolality contributed by the other components. For example, the greater the concentration of these other components, the lower the DE value for the corn syrup that is used. The carbohydrate component can be incorporated in the formulation in an amount of from 10.0 wt % to 30.0 wt % and preferably in an amount of from about 18.0 wt % to about 21.0 wt %.

A dispersible, non-reactive form of magnesium comprises a third component of the nutritional soy protein formulation and this prevents soy protein denaturation and/or thickening. The preferred stabilizing source is an insoluble form of magnesium at pH 6.0–8.0, in particular trimagnesium phosphate in any one of its many states of hydration. Other suitable sources include magnesium phosphate dibasic and magnesium carbonate, although trimagnesium phosphate is preferred. The magnesium salt is incorporated into said formulation in an amount of from about 0.01 wt % to 0.25 wt %, preferably from about 0.05 wt % to about 0.20 wt %.

An optional but preferred fourth component of the nutritional soy protein composition of the present invention is a gum, such as kappa, lambda, or iota carrageenan, locust bean gum, guar gum and mixtures thereof. Unlike soluble fibers, such gums typically function as a suspending agent or thickener and may increase viscosity, if desired. Kappa carrageenan is preferred, however, and may be incorporated in the composition in an amount ranging from 0 wt % to about 0.10 wt % and preferably from about 0.01 wt % to about 0.03 wt %.

The nutritional soy protein formulations of the present invention may be simply formulated as a beverage for oral administration or fed via a nasogastric tube or directly to the stomach using) a gastrostomy tube as is known in the art. The soy protein formulations may also optionally include additional vitamins, minerals, antibiotics, enzymes or medications as may be required in each individual case. If the formulation is intended for oral administration suitable flavors, sweeteners and coloring agents as are known in the art may be added to the formulations for enhancing their visual and organoleptic qualities.

The main components of the invention, soy protein isolate (with or without soy protein concentrate), optionally casein and/or free amino acids, the carbohydrate component, the gum component and magnesium source are preferably formulated with other ingredients as are known in the art for a complete dietary composition. For example, the aforementioned components are generally incorporated in a base consisting of water plus an oil blend comprising one or more oils selected from the group consisting of canola oil, corn oil, soybean oil, sunflower oil, medium chain triglycerides, structured lipids and mixtures thereof. Vitamins may also be added to the formulation for added nutritional benefits and include choline chloride, vitamin E acetate, biotin, vitamin A palmitate, niacinamide, calcium pantothenate, phytonadione, folic acid, cyanocobalamin, cholecalciferol, potassium iodide, thiamin hydrochoride and riboflavin. Pharmaceutically acceptable minerals may also be incorporated in the formulation and include tricalcium phosphate, sodium chloride, sodium ascorbate, magnesium oxide, sodium selenite, chromic acetate, sodium molybdate, zinc sulfate, ferrous sulfate, copper gluconate, pyridoxine hydrochloride. Nucleotides and nucleosides are further optional components.

The following examples are provided to better define and specifically delineate the soy protein compositions of the present invention so as to better enable one skilled in the art how to prepare and formulate them. They are for illustrative purposes only however, and it is recognized that minor changes and variations may be made with respect to the specific ingredients, their amounts and the manner of formulating them. It therefore should be understood that to the extent any such variations do not materially alter or change the characteristics of said formulations, such changes are deemed as falling within the spirit and scope of the invention as defined by the claims that follow.

EXAMPLE 1

The total formulation may be prepared by adding corn syrup and antifoani agent to the majority of the batch water at a temperature of 125°–190° F. This is followed by the addition of the soy protein isolate and, optionally, the soy protein concentrate and/or casein and/or amino acids. The carrageenan gum addition is interspersed with the soy protein addition.

The oil mixture is held in a separate tank. The oil mixture is then added at room temperature to the previously described water mixture, or the oil blend can be heated to a 150°–190° F. if required to dissolve any emulsifier added to the oils. The combined mixture is heated to 140–170° F.

In a separate tank, a vitamin/mineral premix, citrates and optionally choline chloride are added to water at a temperature of from about 40° F. to about 70° F. This mixture is then added to the major component blend.

The entire product mixture is homogenized using a two-stage homogenizer at a temperature of 140°–170° F. The product is cooled to 40° F. and additional water is added as necessary. Vitamin C is also added to the cold product prior to packaging and thermal processing.

A soy protein formulation of the present invention was prepared from the following components wherein soy protein isolate comprised the only source of protein. All percentages given are in weight percent.

| Ingredient | wt. % |
| --- | --- |
| Deionized Water | 71.28739 |
| Corn syrup 25DE | 18.87954 |
| Soy Protein Isolate | 5.34286 |
| Oils | 3.42920 |
| Minerals | 0.46279 |
| Potassium Citrate | 0.29161 |
| Vitamins | 0.6351 |
| Tri-Magnesium Phosphate | 0.12311 |
| Kappa Carrageenan | 0.01500 |
| Antifoam | 0.00500 |
| | 100.00 |

EXAMPLE 2

A second formulation was prepared as follows:

| Ingredient | wt. % |
| --- | --- |
| Deionized Water | 70.90409 |
| Corn syrup, 25DE | 20.05058 |
| Soy Protein Isolate | 4.40000 |
| Oils | 3.46791 |
| Minerals | 0.45985 |
| Potassium Citrate | 0.29118 |
| Vitamins | 0.23231 |
| Tri-Magnesium Phosphate | 0.12309 |
| Sodium Citrate | 0.03599 |
| Antifoam | 0.00500 |
| Kappa Carrageenan | 0.02999 |
| | 1000.00 |

EXAMPLE 3

A third formulation wherein soy protein concentrate was added as a source of protein fiber was prepared as follows:

| Ingredient | wt. % |
| --- | --- |
| Deionized Water | 70.82627 |
| Corn syrup, 25DE | 18.32144 |
| Oils | 3.44837 |
| Soy Protein Isolate | 3.14355 |
| Soy Protein Concentrate | 2.93381 |
| Potassium Citrate | 0.45003 |
| Minerals | 0.40632 |
| Guar Gum, Hydrolyzed | 0.28849 |
| Tri-Magnesium Phosphate | 0.09109 |
| Vitamins | 0.06848 |
| Emulsifier | 0.02216 |
| | 100.00 |

EXAMPLE 4

A fourth formulation comprising soy protein concentrate was prepared as follows:

| Ingredient | wt. % |
| --- | --- |
| Deionized Water | 70.4719 |
| Corn syrup, 25DE | 19.5376 |
| Oils | 3.48642 |
| Soy Protein Concentrate | 2.93395 |
| Soy Protein Isolate | 2.20000 |
| Potassium Citrate | 0.45161 |
| Minerals | 0.33185 |
| Guar Gum, Hydrolyzed | 0.28850 |
| Vitamins | 0.17502 |
| Tri-Magnesium Phosphate | 0.09109 |
| Emulsifier | 0.02216 |
| Kappa Carrageenan | 0.01000 |
| | 100.00 |

EXAMPLE 5

A fifth formulation in which several free amino acids and sodium caseinate replaced a portion of the soy protein component was prepared as follows:

| Ingredient | wt. % |
| --- | --- |
| Deionized Water | 70.90409 |
| Corn syrup, 25DE | 20.05058 |
| Soy Protein Isolate | 3.96000 |
| Sodium Caseinate | 0.11000 |
| Calcium Caseinate | 0.11000 |
| L-Histidine | 0.00880 |
| L-Isoleucine | 0.03080 |
| L-Leucine | 0.06160 |
| L-Lysine | 0.02640 |
| L-Methiomine | 0.01320 |
| L-Phenylalanine | 0.02420 |
| L-Threonine | 0.01760 |
| L-Tryptophan | 0.00660 |
| L-Valine | 0.03080 |
| Oils | 3.46791 |
| Minerals | 0.45985 |
| Potassium Citrate | 0.29118 |
| Vitamins | 0.23231 |
| Tri-Magnesium Phosphate | 0.12309 |
| Sodium Citrates | 0.03599 |
| Antifoam | 0.00500 |
| Kappa Carrageenan | 0.02999 |
| | 100.00 |

All five formulations produced shelf stable organoleptically pleasant soy formulations having a viscosity suitable for enteral tube feeding, i.e., 15–150 centipoise, and are uniform in consistency.

What is claimed is:

1. A stable, liquid nutritional formulation comprising
   (a) a protein component selected from the group consisting essentially of soybean protein isolate or soybean protein concentrate and mixtures thereof;
   (b) a carbohydrate component having a dextrose equivalence of from about 20 to about 30;
   (c) a protein stabilizer which comprises trimagnesuim phosphate; and
   (d) water.
2. The nutritional dietary formulation of claim 1 further comprising a gum component, vitamins and minerals.
3. The nutritional dietary formulation of claim 2 wherein said carbohydrate component comprises hydrolyzed starch, optionally mixed with one or more of oligosaccharides, disaccharides and monosaccharides.

4. The nutritional dietary formulation of claim 3 wherein said carbohydrate component is selected from the group consisting of corn syrup, corn syrup solids, maltodextrin, fructose, sucrose, glucose, and mixtures thereof.

5. The nutritional dietary formulation of claim 2 wherein said gum is selected from the group consisting of kappa, iota or lambda carrageenan, guar gum, locust bean gum and mixtures thereof.

6. The nutritional dietary formulation of claim 1 wherein said soybean protein isolate comprises from about 4 wt % to about 10 wt % based on the total weight of the dietary formulation.

7. The nutritional dietary formulation of claim 3 wherein said carbohydrate component comprises from about 18 wt % to about 30 wt % based on the total weight of the dietary formulation.

8. The nutritional dietary formulation of claim 5 wherein said gum component comprises from about 0 wt % to about 0.5 wt % based on the total weight of the dietary formulation.

9. The nutritional dietary formulation of claim 1 wherein said trimagnesium phosphate comprises from about 0.05 wt % to about 0.30 wt % based on the total weight of the dietary formulation.

10. The nutritional dietary formulation of claim 1 wherein said soy protein concentrate comprises from about 1 wt % to about 5 wt % of the total weight of the dietary formulation.

11. The nutritional dietary formulation of claim 10 further comprising one or more components selected from vitamins, minerals, flavors, fiber, sweeteners, coloring agents, antibiotics, enzymes, bulking agents, medicaments and mixtures thereof.

12. A stable, liquid nutritional dietary formulation comprising
    (a) a protein component consisting essentially of soy protein isolate and soy protein concentrate;
    (b) a carbohydrate component having a dextrose equivalence of from about 20 to about 30;
    (c) a protein stabilizer comprising trimagnesium phosphate; and
    (d) water.

13. The nutritional dietary formulation of claim 12 further comprising a gum component, vitamins and minerals.

14. The nutritional dietary formulation of claim 12 wherein said carbohydrate component comprises hydrolyzed starch, optionally mixed with one or more of oligosaccharides, disaccharides and monosaccharides.

15. The nutritional dietary formulation of claim 14 wherein said carbohydrate component is selected from the group consisting of corn syrup, corn syrup solids, maltodextrin, fructose, sucrose, glucose, and mixtures thereof.

16. The nutritional dietary formulation of claim 13 to wherein said gum is selected from the group consisting of kappa, lambda or iota carrageenan, guar gum, locust bean gum and mixtures thereof.

17. The nutritional dietary formulation of claim 12 wherein said soy protein isolate comprises from about 2.0 wt % to about 10.0 wt % based on the total weight of the dietary formulation.

18. The nutritional dietary formulation of claim 17 wherein said soy protein concentrate comprises from about 1.0 wt % to about 5.0 wt % of the total weight of the dietary formulation.

19. The nutritional dietary formulation of claim 15 wherein said carbohydrate component comprises from about 10 wt % to about 30 wt % based on the total weight of the dietary formulation.

20. The nutritional dietary formulation of claim 16 wherein said gum component comprises from about 0 wt % to about 0.05 wt % based on the total weight of the dietary formulation.

21. The nutritional dietary formulation of claim 1 wherein the said trimagnesium phosphate comprises from about 0.05 wt % to about 0.30 wt % based on the total weight of the dietary formulation.

22. The nutritional dietary formulation of claim 1 formulated for enteral administration.

23. The nutritional dietary formulation of claim 12 formulated for enteral administration.

24. The nutritional dietary formulation of claim 1 formulated for oral administration.

25. The nutritional dietary formulation of claim 12 formulated for oral administration.

26. The stable, liquid nutritional formulation according to claim 1 wherein the formulation is processed with heat.

27. The stable, liquid nutritional formulation according to claim 26 wherein the formulation is homogenized.

* * * * *

UNITED STATES PATENT AND TRADEMARK OFFICE
CERTIFICATE OF CORRECTION

PATENT NO.   : 6,241,996 B1
DATED        : June 5, 2001
INVENTOR(S)  : Douglas Earl Hahn It is certified that error appears in the above-identified patent and that said Letters Patent is hereby corrected as shown below:

Column 8,
Line 54, delete the word "or" and replace with a comma.

Column 9,
Line 22, change the word "phasphate" to -- phosphate --.

Column 10,
Line 8, delete the word "to".
Line 28, after the word "claim", change "1" to -- 12 --.

Signed and Sealed this

Thirteenth Day of August, 2002

*Attest:*

JAMES E. ROGAN
*Director of the United States Patent and Trademark Office*

*Attesting Officer*